United States Patent
Oroskar et al.

(10) Patent No.: US 9,807,586 B2
(45) Date of Patent: *Oct. 31, 2017

(54) ACTIVE SET MANAGEMENT BASED ON THE LIKELIHOOD OF A MOBILE STATION ROAMING

(71) Applicant: Sprint Spectrum L.P., Overland Park, KS (US)

(72) Inventors: Siddharth S. Oroskar, Overland Park, KS (US); Srikanth Pulugurta, Woodstock, VA (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 470 days.

This patent is subject to a terminal disclaimer.

(21) Appl. No.: 14/095,992

(22) Filed: Dec. 3, 2013

(65) Prior Publication Data

US 2014/0120908 A1    May 1, 2014

Related U.S. Application Data

(63) Continuation of application No. 12/940,513, filed on Nov. 5, 2010, now Pat. No. 8,626,154.

(51) Int. Cl.
*H04W 8/02* (2009.01)
*H04W 36/32* (2009.01)
*H04W 36/24* (2009.01)

(52) U.S. Cl.
CPC .............. *H04W 8/02* (2013.01); *H04W 36/32* (2013.01); *H04W 36/245* (2013.01)

(58) Field of Classification Search
CPC ...... H04W 8/02; H04W 36/32; H04W 36/245
See application file for complete search history.

(56) References Cited

U.S. PATENT DOCUMENTS

| | | | |
|---|---|---|---|
| 5,369,681 A | 11/1994 | Boudreau et al. | |
| 5,577,022 A | 11/1996 | Padovani et al. | |
| 5,940,761 A * | 8/1999 | Tiedemann et al. | 455/437 |
| 5,999,522 A | 12/1999 | Rohani | |
| 6,058,136 A | 5/2000 | Ganesh et al. | |
| 6,160,999 A | 12/2000 | Chheda et al. | |
| 6,181,945 B1 | 1/2001 | Lee | |

(Continued)

OTHER PUBLICATIONS

Office Action mailed Oct. 16, 2008 in U.S. Appl. No. 11/265,433, filed Nov. 1, 2005.

(Continued)

*Primary Examiner* — Nathan Mitchell

(57) ABSTRACT

In one aspect, an exemplary method involves a WCD: (i) determining a likelihood of roaming, wherein the likelihood of roaming indicates a likelihood that the WCD will be handed off from a preferred coverage area to a non-preferred coverage area; and (ii) using the likelihood of roaming as a basis for managing an active set of the WCD. In particular, the WCD may manage its active set by setting at least one active-set parameter affecting the number of active sectors in an active set of the WCD, and then maintaining its active set according to the setting of the at least one active-set parameter. According to an exemplary embodiment, a WCD will make an effort to increase the number of sectors in its active set when the likelihood of roaming is greater, and vice versa.

20 Claims, 8 Drawing Sheets

(56) References Cited

U.S. PATENT DOCUMENTS

| | | | |
|---|---|---|---|
| 6,223,042 B1 | 4/2001 | Raffel | |
| 6,317,453 B1 | 11/2001 | Chang | |
| 6,351,642 B1* | 2/2002 | Corbett et al. | 455/442 |
| 6,643,520 B1 | 11/2003 | Kim et al. | |
| 6,745,039 B1 | 6/2004 | Di Lalla | |
| 6,922,561 B2 | 7/2005 | Chen et al. | |
| 6,960,939 B2 | 11/2005 | Ngo | |
| 6,963,750 B1 | 11/2005 | Cheng et al. | |
| 7,050,804 B1 | 5/2006 | Wurtenberger et al. | |
| 7,076,265 B2 | 7/2006 | Tayloe et al. | |
| 7,302,265 B1 | 11/2007 | Chalishazar et al. | |
| 7,366,526 B2 | 4/2008 | Zhang et al. | |
| 7,529,546 B1 | 5/2009 | Sigg | |
| 2002/0049058 A1 | 4/2002 | Tee | |
| 2002/0068566 A1* | 6/2002 | Ohlsson et al. | 455/436 |
| 2002/0119787 A1 | 8/2002 | Hunzinger | |
| 2002/0142772 A1 | 10/2002 | Hunzinger | |
| 2003/0002460 A1* | 1/2003 | English | 370/331 |
| 2003/0186707 A1 | 10/2003 | Pihl et al. | |
| 2003/0195017 A1 | 10/2003 | Chen et al. | |
| 2005/0020203 A1 | 1/2005 | Losh et al. | |
| 2005/0130661 A1* | 6/2005 | Aerrabotu et al. | 455/437 |
| 2006/0135173 A1 | 6/2006 | Vannithamby | |
| 2006/0159051 A1 | 7/2006 | English | |
| 2006/0227744 A1 | 10/2006 | Metke et al. | |
| 2006/0227745 A1* | 10/2006 | Olvera-Hernandez et al. | 370/331 |
| 2006/0229074 A1 | 10/2006 | Semper | |
| 2007/0097924 A1 | 5/2007 | Martinovich et al. | |
| 2007/0105535 A1 | 5/2007 | Jacobson et al. | |
| 2007/0149197 A1* | 6/2007 | Lee et al. | 455/436 |
| 2008/0032713 A1 | 2/2008 | Yang | |
| 2008/0076432 A1 | 3/2008 | Senarath et al. | |
| 2008/0096520 A1 | 4/2008 | Benco et al. | |
| 2008/0293405 A1* | 11/2008 | Meyer | 455/432.1 |
| 2008/0293437 A1 | 11/2008 | Ranganathan et al. | |
| 2009/0061854 A1 | 3/2009 | Gillot et al. | |
| 2009/0239536 A1 | 9/2009 | Fallgren et al. | |
| 2009/0247137 A1 | 10/2009 | Awad | |
| 2011/0021198 A1* | 1/2011 | Breau et al. | 455/437 |
| 2012/0076018 A1 | 3/2012 | Singh et al. | |

OTHER PUBLICATIONS

Scott Baxter, "Course 132 Technical Introduction to CDMA, IS-95 CDMA and a few details of CDMA 2000 1X" available at www.howcdmaworks.com (Feb. 2003) pp. 1-25.

Scott Baxter, "Course 132 Technical Introduction to CDMA, IS-95 CDMA and a few details of CDMA 2000 1X" available at www.howcdmaworks.com (Feb. 2003) pp. 26-50.

Scott Baxter, "Course 132 Technical Introduction to CDMA, IS-95 CDMA and a few details of CDMA 2000 1X" available at www.howcdmaworks.com (Feb. 2003) pp. 51-80.

Scott Baxter, "Course 132 Technical Introduction to CDMA, IS-95 CDMA and a few details of CDMA 2000 1X" available at www.howcdmaworks.com (Feb. 2003) pp. 81-120.

Scott Baxter, "Course 132 Technical Introduction to CDMA, IS-95 CDMA and a few details of CDMA 2000 1X" available at www.howcdmaworks.com (Feb. 2003) pp. 121-155.

Cai et al., "Mitigating DoS Attacks on the Paging Channel by Efficient Encoding in Page Messages," Computer Science Department, University of California, Davis, 2009.

Unpublished U.S. Appl. No. 12/854,114, filed Aug. 10, 2010 entitled "Dynamic Paging Concatenation Based on the Likelihood of Roaming".

Unpublished U.S. Appl. No. 12/794,518, filed Jun. 4, 2010 entitled "Active Set Management Based on Mobile Station Battery Power".

Unpublished U.S. Appl. No. 12/854,119, filed Aug. 10, 2010 entitled "Paging Scheme Settings of Switch Based on Likelihood of Roaming".

* cited by examiner

FIG. 4

| WCD IDENTIFIER | RECENT VISITS (CALLS) | RECENT VISITS (CALLS) RESULTING IN RAPID HANDOFF | PERCENTAGE |
|---|---|---|---|
| 312-555-1000 | 5 | 0 | 0% |
| 312-555-1001 | 14 | 7 | 50% |
| 312-555-1002 | 80 | 8 | 10% |
| 312-555-1003 | 3 | 3 | 100% |

ACTIVE SET MANAGEMENT BASED ON THE LIKELIHOOD OF A MOBILE STATION ROAMING

CROSS-REFERENCE TO RELATED APPLICATION

This patent application claims priority to U.S. application Ser. No. 12/940,513, which was filed on Nov. 5, 2010, the contents of which are entirely incorporated herein by reference, as if fully set forth in this application.

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism. The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link may define, for example: (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Further, a switch may be configured to re-send a page in the event that a given attempt to page a WCD fails.

Wireless service providers typically design their wireless networks to comprise a number of partially-overlapping wireless coverage areas. As a WCD that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage.

However, it is not economically feasible for any given wireless service provider to deploy perfect wireless coverage. Thus, wireless service providers often partner with other wireless service providers to form roaming agreements. According to these roaming agreements, when a wireless service provider cannot provide reasonable wireless coverage to a WCD, the WCD may instead be served by one of the wireless service provider's roaming partners. Consequently, the roaming partner provides wireless service for the WCD for a period of time, typically until the wireless service provider can once again provide a reasonable wireless coverage to a WCD.

OVERVIEW

According to the embodiments herein, a radio access network (RAN) and/or a wireless communication device (WCD) may be able to determine when the WCD is likely to roam to a coverage area served by a different service provider. The RAN and/or the WCD may then proactively take steps to reduce the likelihood of this roaming. In an exemplary embodiment, active-set parameters of a WCD may be adjusted according to the likelihood of the WCD roaming.

More specifically, a wireless service provider may operate and/or control a RAN that provides a preferred wireless coverage area to serve WCDs. The wireless service provider may categorize wireless coverage areas that the wireless service provider operates and/or controls as "preferred,"

while categorizing wireless coverage areas that the wireless service provider's roaming partners operate and/or control as "non-preferred." Further, the wireless service provider that provides service in a preferred coverage area may be referred to as the "home" service provider. In order to avoid handing off a WCD to a non-preferred wireless coverage area, a RAN and/or a WCD may consider roaming data associated with the WCD. This roaming data may be, for instance, historical data representing the WCD's past handoff behavior. For instance, in an exemplary embodiment, a WCD and/or a RAN may attempt to reduce the likelihood of a handoff to a non-preferred coverage area by adjusting one or more of the WCD's active-set parameters in an effort to increase the number of sectors that are included in the WCD's active set.

WCDs are typically configured such that only sectors that are served by the home service provider are added to the active set. Therefore, having more active sectors typically means that a WCD has more preferred coverage areas to which the WCD can attempt to connect. When no sectors of the home service provider meet the criteria, the WCD may add a sector from a non-preferred coverage area to its active set, thus creating the possibility that the WCD will hand off to the non-preferred coverage area. Accordingly, a WCD may attempt to increase or decrease the number of sectors that are included in its active set at a given point in time by adjusting the parameters that govern, for example: (a) the maximum number of active sectors that can be included in the active set, (b) the criteria for adding a sector to the active set, and/or (c) the criteria for keeping a sector in the active set. Increasing such active set parameters in an effort to increase the number of active sectors may therefore reduce the probability of a scenario where no sector that is served by the home service provider meets the criteria to be added to or kept in the active set.

In one aspect, an exemplary method involves a WCD: (i) determining a likelihood of roaming, wherein the likelihood of roaming indicates a likelihood that the WCD will be handed off from a preferred coverage area to a non-preferred coverage area; and (ii) using the likelihood of roaming as a basis for managing an active set of the WCD. In particular, the WCD may manage its active set by setting at least one active-set parameter affecting the number of active sectors in an active set of the WCD, and then maintaining its active set according to the setting of the at least one active-set parameter.

The function of using the likelihood of roaming as a basis for managing an active set may involve setting a maximum number of active sectors that the WCD can include in the active set of the WCD. For example, if the likelihood of roaming is below a first threshold, then a WCD may set the maximum number of active sectors to a first maximum number. On the other hand, if the likelihood of roaming is above the first threshold, then the WCD may set the maximum number of active sectors to a second maximum number that is greater than the first maximum number. Additionally or alternatively, setting the at least one active-set parameter may involve setting at least one of (a) a threshold pilot strength for addition to the active set (T_ADD), (b) a threshold difference in signal strength from an active set pilot (T_COMP), (c) a threshold pilot strength for removal from the active set (T_DROP), and (d) a time for which an active set pilot falls below T_DROP to justify removal from the active set (T_TDROP).

In a further aspect, another exemplary method involves a RAN: (i) determining a likelihood of roaming for a wireless communication device (WCD), wherein the WCD is operating in a preferred coverage area of the RAN, and wherein the likelihood of roaming indicates a likelihood that the WCD will be handed off from the preferred coverage area to a non-preferred coverage area; and (ii) the RAN using the likelihood of roaming for the WCD as a basis for managing an active set of the WCD.

In yet a further aspect, an exemplary WCD system may include: (i) a non-transitory computer-readable medium; and (ii) program instructions stored on the non-transitory computer-readable medium and executable by at least one processor to: (a) determine a likelihood of roaming, wherein the likelihood of roaming indicates a likelihood that a wireless communication device (WCD) will be handed off from a preferred coverage area to a non-preferred coverage area; and (b) use the likelihood of roaming as a basis to manage an active set of the WCD.

And in yet a further aspect, an exemplary RAN system may include: (i) a non-transitory computer-readable medium; and (ii) program instructions stored on the non-transitory computer-readable medium and executable by at least one processor to: (a) determine a likelihood of roaming for a wireless communication device (WCD), wherein the WCD is operating in a preferred coverage area of the RAN, and wherein the likelihood of roaming indicates a likelihood that the WCD will be handed off from the preferred coverage area to a non-preferred coverage area; and (b) use the likelihood of roaming for the WCD as a basis to manage an active set of the WCD.

These and other aspects and advantages will become apparent to those of ordinary skill in the art by reading the following detailed description, with reference where appropriate to the accompanying drawings. Further, it should be understood that the foregoing overview is merely for purposes of example and is not intended to limit the scope of the invention as claimed.

BRIEF DESCRIPTION OF THE DRAWINGS

An exemplary embodiment of the present invention is described herein with reference to the drawings, in which:

FIG. 4 is a table illustrating historical roaming data, according to an exemplary embodiment;

DETAILED DESCRIPTION

Exemplary embodiments of the present invention are described herein. Employing various embodiments of the present invention, a wireless service provider may be able to, in some cases, avoid the usage of non-preferred wireless coverage by its subscribed wireless communication devices (WCDs). In turn, this may reduce the roaming fees that the wireless service provider is charged by other wireless service providers (e.g., roaming partners).

It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

It should be noted that the term "handoff" is to be interpreted broadly herein. Thus, a WCD being "handed off" from a preferred wireless coverage area to a non-preferred wireless coverage area may include scenarios in which (i) the WCD is participating in communication via the preferred wireless coverage area when the handoff occurs, (ii) the WCD is not participating in communication via the preferred wireless coverage area when the handoff occurs, and (iii) the WCD engages in a first call via a preferred wireless coverage area, the first call is terminated, and soon after the WCD engages in a second call via a non-preferred wireless coverage area.

I. Network Architecture

Figure 1:
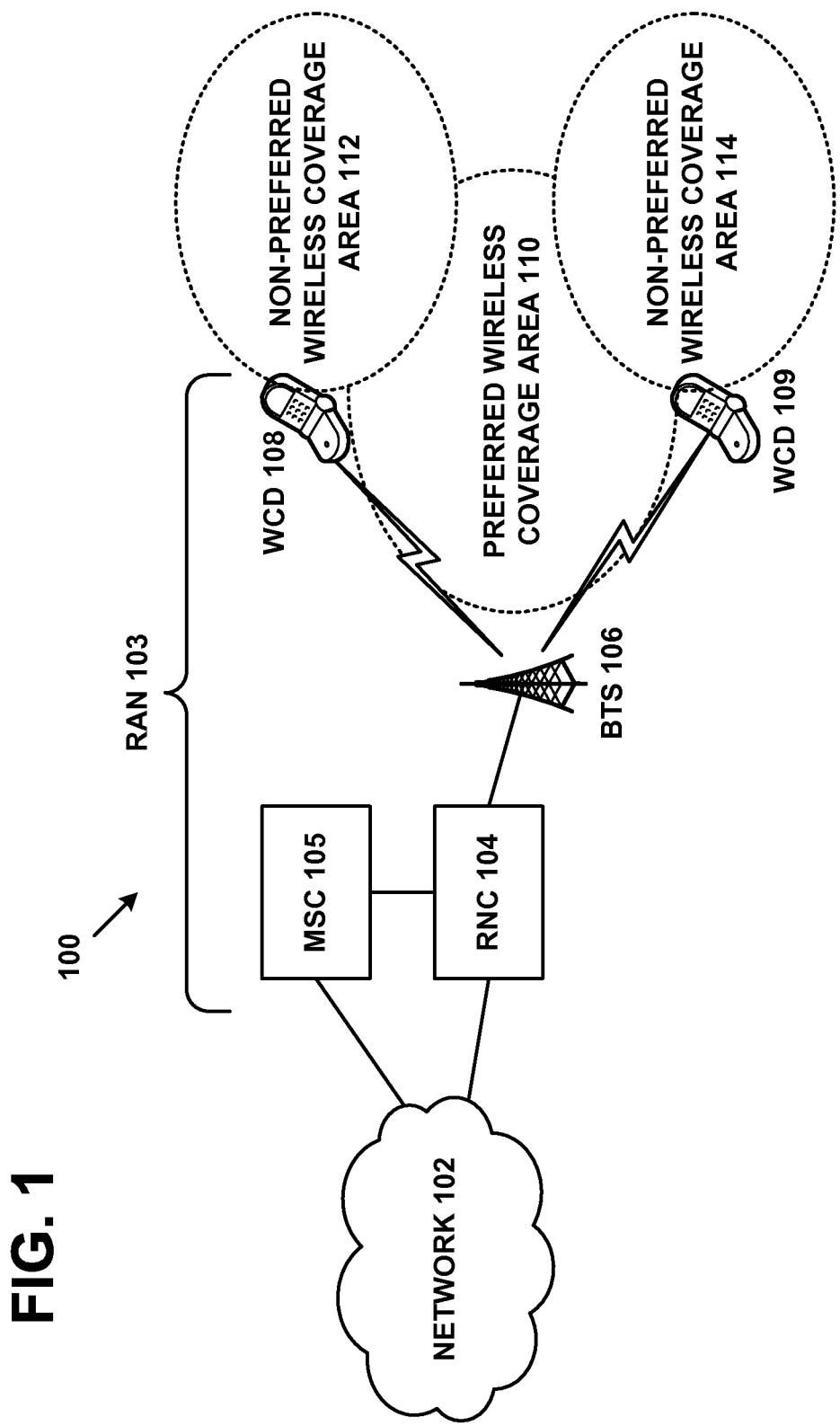
FIG. 1 depicts an exemplary communication system in which an exemplary embodiment can be carried out or deployed.

FIG. 1 depicts an exemplary communication system 100 in which the embodiments herein can be carried out or deployed. At a high level, communication system 100 comprises a network 102, a RAN 103, a preferred wireless coverage area 110, and non-preferred wireless coverage areas 112 and 114. Any of the wireless coverage areas may provide wireless communication services to WCD 108 and/or WCD 109.

Network 102 is preferably a packet-switched and/or circuit-switched communication network that links RAN 103 to other networks, devices, applications, and/or services. Network 102 may be, for instance, the Internet, a private IP network, the public-switched telephone network (PSTN) or a private circuit-switched network. Network 102 may comprise one or more switches, gateways, routers, signaling nodes, application servers, and/or other types of devices, systems and networks. In one possible embodiment, network 102 includes both packet-switching and circuit-switching capabilities.

RAN 103 may include a base station controller (BSC) 104, a mobile switching center (MSC) 105, a base transceiver station (BTS) 106, and other RAN components. However, for sake of simplicity, FIG. 1 excludes some of these components, such as softswitches, media gateways, media gateway controllers, signaling nodes, authentication servers, registration servers, and so on. Furthermore, throughout this description, the term "RAN component" may be used to refer to a BTS, a BSC, a combination of one or more BTSs and a BSC, or any other type of component used for RAN functionality.

BTS 106 may radiate on one or more frequencies to define preferred wireless coverage area 110. Preferred wireless coverage area 110, may, in turn, serve WCD 108 and/or WCD 109. To supply wireless service to these WCDs, as well as other WCDs, preferred wireless coverage area 110 may include an air interface that comprises one or more forward link and/or reverse link channels. Through the forward and reverse link channels, BTS 106 and WCD 108 and/or WCD 109 may exchange signaling and bearer traffic.

In one possible embodiment, these channels may be formed via a set of orthogonal Code Division Multiple Access (CDMA) codes, each of which may be used to modulate the data transmitted on a particular channel. However, other embodiments using different technologies are also possible. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi). Thus, RAN 103 may operate according to one or more of CDMA, any of these other technologies, and/or additional technologies now known or developed in the future.

The forward link channels, which carry data from BTS 106 to WCD 108 and from BTS 106 to WCD 109, may include a pilot channel, over which a phase offset pattern is repeatedly transmitted, a sync channel over which synchronization data, such as a timing reference, is transmitted, and traffic channels over which bearer traffic directed to WCD 108 and/or WCD 109 is transmitted. Additionally, one or more of the forward link channels may be designated as primary and/or secondary paging channels, and may be used for contacting WCDs.

The reverse link channels, which carry data from WCDs 108 and 109 to BTS 106, may also be formed through the use of CDMA or other technologies. These reverse link channels may include, for example, an access channel for responding to paging messages and for initiating communications, and reverse traffic channels for transmitting bearer traffic from WCD 108 to BTS 106 and from WCD 109 to BTS 106.

BSC 104 may perform a variety of tasks, including management of the wireless resources associated with BTS 106, and routing of traffic to and from BTS 106. Further, BSC 104 may be able to facilitate handoff of WCD 108 and/or WCD 109 from one wireless coverage area to another (e.g., between preferred wireless coverage area 110 and one of the non-preferred wireless coverage areas). BSC 104 may be communicatively coupled to network 102 either directly or via one or more links or other devices. For instance, BSC 104 may communicate with network 102 via MSC 105 or via an access gateway (not shown), such as a packet data serving node (PDSN) or an access serving network gateway (ASN-GW).

MSC 105 may perform many of the functions of a Class 5 telephony switch, but with additional functionality to manage the mobility of subscriber devices, such as WCD 108 and 109. For example, MSC 105 may comprise or be communicatively coupled with a visitor location register (VLR) and a home location register (HLR). MSC 105 may be responsible for switching functions, media transport functions, transcoding functions, short message service (SMS) functions, and managing the communications between WCDs and any the circuit switched functions of network 102 or other networks.

Furthermore, MSC 105 may track subscriber usage to facilitate billing and performance monitoring. To do so, for each call that the MSC 105 handles, MSC 105 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 105 may transmit these CDRs to a central entity that maintains a database in which the CDRs are compiled. It should be understood that RAN components other than MSCs may generate CDRs in addition to or instead of MSC 105 generating CDRs.

Preferred wireless coverage area 110 may be defined by BTS 106 radiating on one or more frequencies. Similarly, BTSs that are under the control of other entities may radiate on one or more frequencies to define non-preferred wireless coverage areas 112 and 114. The frequencies used to define each of these wireless coverage areas may be non-overlapping in order to reduce interference. Alternatively, the frequencies used by these wireless coverage areas may overlap with one another to some extent.

Although three wireless coverage areas are shown in FIG. 1, the embodiments herein may make use of more or fewer wireless coverage areas. For example, RAN 103 may radiate to define more than one preferred wireless coverage area. Similarly, there may be only one or more than two non-preferred wireless coverage areas. While FIG. 1 depicts the physical coverage of preferred wireless coverage area 110 partially overlapping with that of non-preferred wireless coverage areas 112 and 114, preferred wireless coverage area 110 may overlap with these non-preferred wireless coverage areas more or less than is shown. Thus, for instance, preferred wireless coverage area 110 may fully overlap or not overlap at all with one or more of non-preferred wireless coverage areas 112 and 114.

WCD 108 and WCD 109 may be two of potentially many WCDs being provided service in preferred wireless coverage area 110. Such WCDs could be a wireless telephone, a wireless personal digital assistant, a wirelessly equipped laptop computer, a wireless router, or another type of mobile or fixed wireless device. Preferably, a WCD is a subscriber device that is manipulated by a human in order to establish and engage in circuit-switched or packet-switched voice and/or data calls. However, a WCD could also be an automated device without a human interface.

A WCD may be associated with zero or more RANs at a time and may use the wireless coverage areas of these RANs to communicate, via network 102, with correspondent nodes, such as web servers, gaming servers, short message service (SMS) servers, signaling and media nodes, other WCDs, and other communication devices (e.g., wireline phones). Further, a WCD may be in communication with one or more preferred and/or non-preferred wireless coverage areas simultaneously, even if the WCD is only using one of these wireless coverage areas to communicate with the correspondent nodes.

Receiving signals from multiple wireless coverage areas simultaneously may provide advantages for a WCD. For instance, doing so allows the WCD to keep track of neighboring wireless coverage areas that are candidates for a handoff. Regularly, or from time to time, the WCD may measure the strength of the signals received from each wireless coverage area. These signals may be received on a traffic channel, a paging channel, or some other type of channel, and the measurements may involve determining the signal-to-noise ratio (SNR) and/or the frame error rate (FER) of the signals. When a WCD is served by a given wireless coverage area and determines that the signal strength the WCD received from this given wireless coverage area has dropped below a signal-strength threshold, the WCD may request a handoff from the given wireless coverage area to a new wireless coverage area from which the WCD has received a higher signal strength. The WCD may also request a handoff to a new wireless coverage area when the received signal strength of the new wireless coverage area exceeds that of the given wireless coverage area by some amount. As a result of measuring this received signal strength and using these measurements to influence handoff behavior, handoffs may be faster and less disruptive. For instance, the WCD may be handed off from the given wireless coverage area before it experiences a poor signal strength from the given wireless coverage area that substantially compromises the WCD's ability to communicate.

It should be understood that FIG. 1 is presented merely for purposes of example, and that communication network 100 may comprise more or fewer components in different arrangements than shown. Further, each of these devices, such as BSC 104, MSC 105, and BTS 106, may include multiple physical or logical components arranged to operate in conjunction with one another. Alternatively or additionally, these devices may be able to be combined with one another into a smaller number of logical or physical devices. In sum, changes may be made to the arrangement illustrated by FIG. 1 without departing from the scope of the invention.

II. Service-Provider Roaming Agreements

In an exemplary embodiment, a preferred coverage area may be a coverage area served by a subscriber's own service provider (i.e., the subscriber's home service provider), while a non-preferred coverage area may be a coverage area served by another service provider. For instance, turning back to FIG. 1, WCD 108 and WCD 109 may be subscribed to the wireless service provider that controls and/or operates preferred wireless coverage area 110. One way in which the preferred status for a given coverage area may be established is that a user of one of these WCDs may purchase or lease their WCD from the service provider that provides service in that coverage area (i.e., the home service provider for the coverage area). Then, for predetermined fees, the WCD may be used to communicate via any of the home service provider's wireless coverage areas. Alternatively, a user of the WCD may purchase or lease the WCD from a third-party entity, such as a wholesaler or reseller, and then register the WCD for service with the home service provider.

As noted above, it may not be feasible for any given wireless service provider to deploy perfect wireless coverage. Thus, wireless service providers often partner with other wireless service providers to form roaming agreements. According to these roaming agreements, when a wireless service provider cannot provide a reasonable wireless coverage to a WCD, the WCD may instead be served by one of the wireless service provider's roaming partners. Roaming partners may be wireless service providers in their own right, and therefore may also serve their own subscribed WCDs. A roaming partner may provide wireless service to the WCD for a period of time, typically until the wireless service provider can once again provide a reasonable wireless coverage to the WCD. In FIG. 1, non-preferred wireless coverage areas 112 and 114 may be controlled and/or operated by one or more roaming partners of the home service provider.

It may be advantageous for the home service provider to have one or more roaming partners, because allowing WCD 108 and/or WCD 109 to use these roaming partners' wireless service areas may increase the overall wireless coverage available to WCD 108 and/or WCD 109, thereby increasing customer satisfaction. However, roaming agreements between wireless service providers often involve an assessment of fees. For example, a roaming partner of the home service provider may charge the home service provider a fee when WCD 108 or WCD 109 uses one or more of the roaming partner's wireless coverage areas. Typically, no fees are charged if a roaming WCD is idle. But, if the roaming WCD makes a substantial use of the roaming partner's wireless coverage area(s), the home service provider may be charged for that use. Such a substantial use might include, for example, making a voice or data call, or transmitting or receiving a text or multimedia message.

The fee for this use may be assessed on a per-time-unit basis, per-data-unit basis, per transaction basis, or some other basis. Thus, for example, if a WCD participated in a voice or data call while roaming, a fee may be assessed based on the number of minutes (or fractions of minutes) that the call lasted (e.g., eight cents per minute). Alternatively, the fee may be assessed based on the amount of data transferred to and/or from the WCD during the course of the call (e.g., twenty-five cents per megabyte of data sent or received by the WCD). For some applications or services, such as text or multimedia messaging, fees may be assessed on a per-transaction basis (e.g., ten cents per text message).

While the home service provider can pass on some or all of these roaming fees to the user of the WCD, doing so may lead to the user becoming frustrated with the home service provider. Thus, it may be advantageous for the home service provider to try to reduce the extent of roaming so that roaming fees are reduced. The effect of doing so may be lower costs paid by the home service provider and/or users, ultimately resulting in higher user satisfaction with the home service provider.

III. Wireless Communication Device Embodiment

Figure 2:
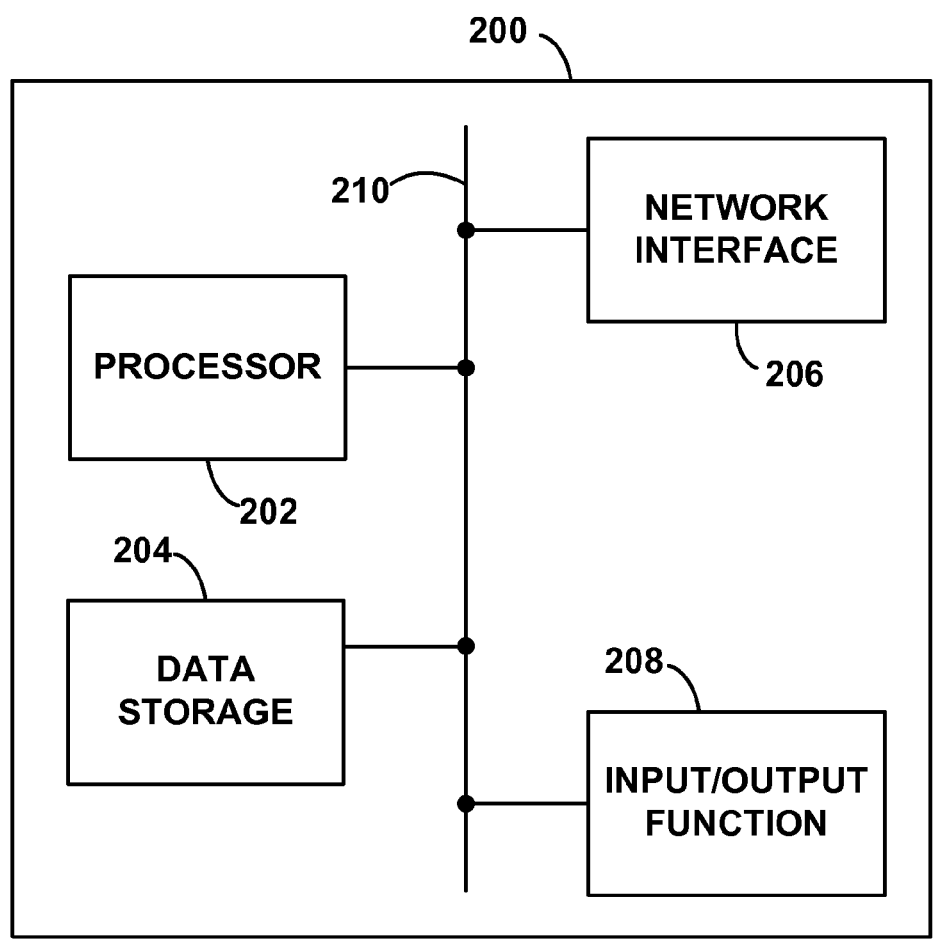
FIG. 2 is a simplified block diagram illustrating a wireless communication device, according to an exemplary embodiment.

FIG. 2 is a simplified block diagram exemplifying a WCD 200, and illustrating some of the functional components that would likely be found in a WCD arranged to operate in accordance with the embodiments herein. As shown, WCD 200 preferably includes at least one processor 202, data storage 204 (i.e., a non-transitory computer readable medium), and at least one transceiver 206 and antenna 207 for sending and/or receiving wireless communication under one or more air-interface protocols. Some or all of these components of WCD 200 may be coupled together by a system bus 208 or a similar mechanism.

Further, as shown, an exemplary WCD 200 may also include an input/output function 210. Input/output function 210 may facilitate user interaction with example RAN component 210. Input/output function 210 may comprise multiple types of input devices, such as a keyboard, a mouse, a touch screen, and so on. Similarly, input/output function 210 may comprise multiple types of output devices, such as a monitor, printer, or one or more light emitting diodes (LEDs).

In an exemplary embodiment, WCD 200 may be configured to maintain an "active set" of sectors (each referred to as an "active sector") for which the WCD monitors the signal strength, and which the WCD is in communication with during a call. For example, under IS-2000, a base station may provide the WCD the following parameters, which relate to pilot signal strength and are used by the WCD to maintain its active set:

T_ADD: Threshold pilot strength for addition to the active set (e.g., −14 dB)
T_COMP: Threshold difference in signal strength from an active set pilot (e.g., 2 dB)
T_DROP: Threshold pilot strength for removal from the active set (e.g., −16 dB)
T_TDROP: Time for which an active set pilot falls below T_DROP to justify removal from the active set (e.g., 2 seconds)

The base station also provides the WCD with a Neighbor List Update Message (NLUM), which identifies the "neighbor" sectors, which are not in the active set, but are identified as candidates for the active set.

The WCD 200 then scans for all of the pilot signals from the sectors in its active set, and measures the received signal strength for each. For example, WCD 200 may calculate Ec/Io for each sector in the active set, where Ec is energy per chip and Io is the total power received. If the pilot signal strength of any neighbor sector exceeds T_ADD, the WCD 200 adds the pilot to its "candidate" set and sends a Pilot Strength Measurement Message (PSMM) to the base station with the estimated Ec/Io for the pilot and information indicative of the identity of the sector. Further, if the pilot strength exceeds the strength of any active-sector signal by T_COMP (and possibly also depending on current capacity and other issues), then the base station may send a Handoff Direction Message (HDM) to the WCD, listing the pilot as a new member of the active set. Upon receipt of the HDM, the WCD 200 then adds the pilot to its active set as instructed, and the WCD sends a Handoff Completion Message (HCM) to the base station (e.g., to BTS 108), acknowledging the instruction, and providing a list of the pilots (PN offsets) in its active set. Depending on system configuration, the WCD may also identify pilot signals from the remaining set of sectors if they exceed the thresholds. It should be understood that each active sector in the active set is represented by its corresponding PN offset, and that references to an active sector may also be considered to refer to the PN offset of the active sector.

Similarly, if the WCD 200 detects that the signal strength of a pilot in its active set drops below T_DROP, the WCD starts a handoff drop timer. If T_TDROP passes, the WCD then sends a PSMM to the base station, indicating the Ec/Io and drop timer. The base station may then respond by sending an HDM to the WCD, without the pilot in the active set. The WCD would then receive the HDM and responsively move the pilot to its neighbor set and send an HCM to the base station.

Under IS-2000, a WCD 200 will continually scan its active sectors, neighbor sectors, and candidate sectors in a cyclical manner, according to a schedule under which active sectors are scanned twice as frequently of neighbor sectors, and neighbor sectors in turn are scanned twice as frequently as candidate sectors. The details of this scanning process are generally known to those skilled in the art, and thus not discussed in further detail herein. Further, when the WCD 200 is engaged in IS-2000 communications, WCD 200 decodes transmissions using all the PN offsets in its active set, together with the respective Walsh codes assigned for each PN-identified sector. Then, on a frame-by-frame basis, the WCD may select a sector from its active set from which to receive forward-link traffic.

To implement this functionality (and other mobile-station functionality described herein), an exemplary WCD may include a tangible computer-readable medium with program instructions stored thereon, which are executable by a processor to carry out the various functions described herein. For example, an exemplary WCD may include program instructions that are executable to: (a) determine a likelihood of roaming, which indicates a likelihood that a given WCD will be handed off from a preferred coverage area to a non-preferred coverage area; and (b) use the likelihood of roaming as a basis to manage an active set of the WCD.

In an exemplary embodiment, a WCD may be configured to manage its active set using a number of techniques. In particular, since increasing the number of sectors in the active set may reduce the likelihood of a handoff to a non-preferred coverage area, an exemplary WCD may be configured to dynamically adjust the active-set parameters that can affect the size of its active set.

For instance, an exemplary WCD may be configured vary the maximum number of active sectors by updating a maximum-active-sector parameter, which is stored locally in memory, and which indicates the current maximum number of active sectors that are allowable in the active set. As an example, the WCD may by default set a maximum-active-sector parameter to three, in which case up to three sectors may be included in the active set and scanned as active sectors. However, the WCD may adjust the maximum number of active sectors by setting the maximum-active-sector parameter to six, for instance, in which case up to six sectors may be included in its active set. Other adjustments to the maximum number of active sectors are also possible.

It should be understood that there is no requirement that a WCD actually include the maximum number of active sectors in its active set. This maximum number should therefore be understood as a constraint on the active set, but not necessarily a requirement. As such, it is possible that, at a given point in time, less than the maximum number of sectors meet the criteria for the active set, and as a result, less than the maximum number of sectors will be included in the active set.

In addition or in the alternative to adjusting the maximum-active-sector parameter, an exemplary WCD may be configured to adjust a number of parameters affecting whether a sector is included in the active set, either alone or in combination with each other. For example, the WCD may adjust the value of T_ADD, T_COMP, T_DROP, and/or T_TDROP in an effort to, for example, increase the probability a sector is added to its active set or increase the probability that an active sector is kept in the active set.

IV. RAN Component Embodiment

Figure 3:
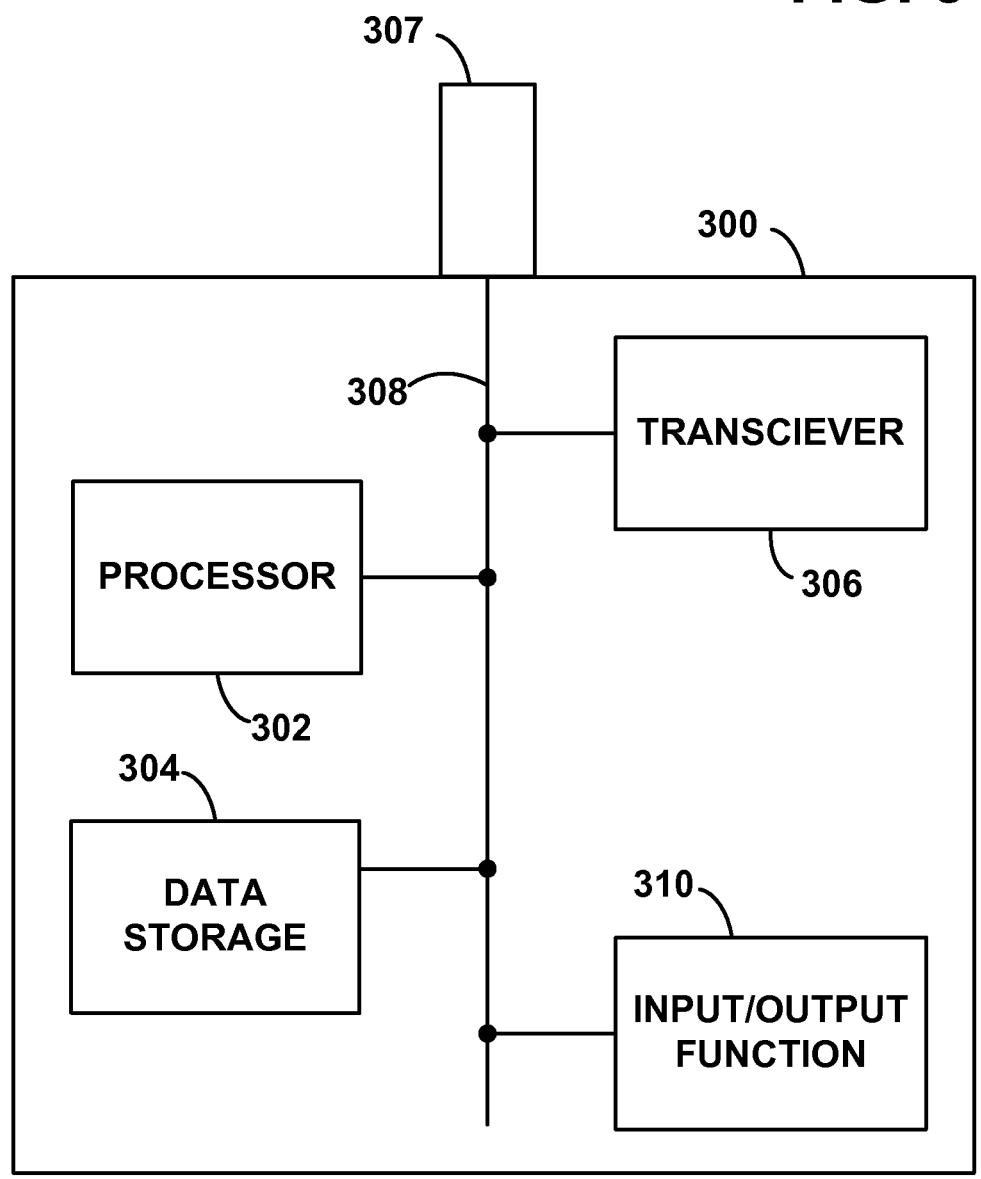
FIG. 3 is a simplified block diagram exemplifying a component of a radio access network, according to an exemplary embodiment.

FIG. 3 is a simplified block diagram exemplifying a RAN component 300, and illustrating some of the functional components that would likely be found in a RAN component arranged to operate in accordance with the embodiments herein. Example RAN component 300 could be any type of device found in or associated with a RAN, such as a BTS, an BSC, and/or an MSC.

Example RAN component 300 preferably includes a processor 302, a data storage 304, a network interface 306, and an input/output function 308, all of which may be coupled together by a system bus 310 or a similar mechanism. Processor 302 preferably includes one or more CPUs, such as one or more general purpose processors and/or one or more dedicated processors (e.g., application specific integrated circuits (ASICs) or digital signal processors (DSPs), etc.)

Data storage 304, in turn, may comprise volatile and/or non-volatile memory and can be integrated in whole or in part with processor 302. Data storage 304 preferably holds program instructions that are executable by processor 302, and further may hold data that is manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

In an exemplary embodiment, the RAN component may be a BTS that is configured to (a) determine a likelihood of roaming for a WCD that is operating in a preferred coverage area of the RAN, where the likelihood of roaming indicates a likelihood that the WCD will be handed off from the preferred coverage area to a non-preferred coverage area; and (b) use the likelihood of roaming for the WCD as a basis to manage an active set of the WCD.

V. Determining the Likelihood Roaming for a WCD

As noted, in an exemplary embodiment a WCD may be sent an indication of the likelihood of roaming whenever it registers with the RAN in a new sector. Accordingly, a RAN may be configured to determine the likelihood of roaming, and to send an indication of the likelihood of roaming (i.e., a "roaming-likelihood indicator") to a WCD. In an exemplary embodiment, a RAN may determine the likelihood of roaming using various different techniques.

More specifically, referring back to FIG. 1, if WCD 108 has exhibited a tendency to roam from the preferred coverage area 110 in which the WCD is located, to an adjacent non-preferred wireless coverage area, then it may be likely that WCD 108 will do so again. For instance, suppose that WCD 108 has been served by preferred wireless coverage area 110 ten times in the last week. If, out of these ten occasions, WCD 108 roamed from preferred wireless coverage area 110 to non-preferred wireless coverage area 112 five times and to non-preferred wireless coverage area 114 two times, then WCD 108 has demonstrated a tendency to roam. In this case, 70% of the time that WCD 108 was served by preferred wireless coverage area 110, WCD 108 began roaming to a wireless coverage area of a roaming partner.

There are several possible reasons for why WCD 108 could exhibit this behavior. One reason may be that WCD 108 may have hardware, software, or mechanical characteristics that make it difficult for WCD 108 to transmit or receive properly on the frequency or frequencies used by preferred wireless coverage area 110. For example, WCD 108 might be a relatively old model with a transceiver that has deteriorated over time. Even if WCD 108 is not able to transmit or receive properly via preferred wireless coverage area 110, WCD 108 may be able to transmit and receive properly on other preferred or non-preferred wireless coverage areas. For instance, WCD 108 may be able to communicate with fewer problems when using the frequencies of non-preferred wireless coverage areas 112 and 114. In other words, communication problems that WCD 108 experiences in preferred wireless coverage area 110 may or may not occur in other wireless coverage areas.

Another possible reason for WCD 108 being handed off to a non-preferred wireless coverage area with some frequency could be the physical location in which WCD 108 is typically used. For instance, a user of WCD 108 may live, work, or spend a substantial amount of time near a border of preferred wireless coverage area 110. Due to this physical proximity to the border, the signal strength of preferred wireless coverage area 110 received by WCD 108 may be poor. Alternatively, the user of WCD 108 may spend a substantial amount of time in a physical location within the bounds of preferred wireless coverage area 110, but still receive a poor signal strength from this wireless coverage area. For example, this location could be a basement or the center of a large structure. As another example, the user of the WCD may simply be a highly mobile user, or may be highly mobile in a particular region. Under such conditions, WCD 108 may frequently roam to one of non-preferred wireless coverage areas 112 and 114. For any of these reasons, or for other reasons, the historical roaming data of a WCD, such as WCD 108, may indicate that the WCD is likely to roam from a preferred wireless coverage area to a non-preferred wireless coverage area again in the future.

In order to detect that a WCD 108 is likely to begin roaming, a RAN 103 may collect data regarding when the WCD engages in a handoff. To that end, there may be multiple ways through which the RAN 103 can learn that a WCD 108 has been handed off. For instance, during the handoff process, the WCD 108 may inform the RAN 103 (via BTS 106, BSC 104, and MSC 105) of the non-preferred wireless coverage area 112 to which the WCD is being handed off. Alternatively, the RAN 103 may receive, from the roaming partner that controls the non-preferred wireless coverage area 112, signaling messages indicating that the WCD has been handed off to the non-preferred wireless coverage area.

However, if the RAN 103 does not receive an explicit indication that the WCD 108 was handed off, the RAN may infer that a handoff occurred. For example, the WCD 108 may be taking part in a call via the preferred wireless coverage area 110. The RAN 103 may receive an indication that a call leg between the RAN 103 and the WCD 108 was terminated, and may record the time of the termination, as well as the caller, callee, an identifier of the preferred wireless coverage area, and related information. (It should be understood that a call leg is segment of a call between two endpoints. Thus, when the WCD 108 is handed off from a first BTS 106 to a second BTS, the WCD may maintain the end-to-end call, but replace the call leg between the WCD and the first BTS with a call leg between the WCD and the second BTS.) These records may take the form of CDRs.

At a later point in time (e.g., minutes, hours, or days after the call was terminated), the home service provider may receive records of call legs and/or calls engaged in by the home service provider's subscribed mobiles in roaming partners' wireless coverage areas. In an exemplary embodiment, the records may be formatted according to Transferred Account Procedure (TAP) or Cellular Intercarrier Billing Exchange Roamer (CIBER). Such records may comprise CDRs for each call or call leg made by a roaming WCD, including the WCD's location, the calling party, the called party, the time of the call, and the duration of the call. The home service provider may accordingly implement systems that store such data provided by roaming partners. Further, such records may be sent directly from a roaming partner to the home service provider, or be relayed to the home service provider via a third party billing aggregator.

By correlating these received records with similar records recorded by the RAN 103, the home service provider may be able to determine whether a WCD 108 that took part in a call via the preferred wireless coverage area 110 was rapidly handed off to a non-preferred wireless coverage area and took part in another call via the non-preferred wireless coverage area. For instance, the RAN 103 may compare the caller and callee of a terminated call leg that took place in the preferred wireless coverage area 110 to the caller and callee of call leg that subsequently took place in the non-preferred wireless coverage area 112. If the parties that took part in these calls are the same, this may indicate that the call was handed off from the preferred wireless coverage area 110 to the non-preferred wireless coverage area 112, or that the call was dropped during the course of such a handoff, and then reestablished via the non-preferred wireless coverage area. Regardless, if the time between the call being terminated in the preferred wireless coverage area and a corresponding call being initiated in the non-preferred wireless coverage area is below a threshold value, the RAN 103 may consider these events to be a "handoff."

In order to efficiently use such historical roaming data, the RAN may have access to information such as that in FIG. 4. Table 400 in FIG. 4 contains entries 402, 404, 406, and 408 of example data that could assist a RAN in performing this task. For each entry, table 400 stores a WCD identifier, a number of recent visits/calls, another number of recent visits/calls resulting in a rapid handoff to a non-preferred wireless coverage area, and a percentage.

A table like table 400 may be maintained for each preferred wireless coverage area. Further, a database storing data such as that of table 400 may be maintained by a service provider, or by a third party entity. Thus, the data may be maintained at an existing RAN component, at a standalone RAN component, or at a separate component to which the RAN has access. The information in table 400 may be presented or stored in other ways as well. As an alternative, the RAN may not have direct access to such a table, and may instead retrieve historical roaming data on an as-needed basis.

With respect to the contents of table 400, a WCD identifier may be a string of characters or bits that can be used to identify a WCD. As noted above, examples of WCD identifiers include NAIs, MDNs, MINs, IMSIs, ESNs, and MEIDs. Any of these types of WCD identifiers, or other data that can be used to identify WCDs, may be used in the "WCD identifier" column of table 400. For purposes of simplicity, entries 402, 404, 406, and 408 contain MDNs (phone numbers) as WCD identifiers, but other types of WCD identifiers may be used instead.

An entry in the "recent visits (calls)" column may be a count of recent visits that the WCD made to the preferred wireless coverage area. Such a visit may entail a WCD registering for service with the preferred wireless coverage area, but not necessarily making any calls in the preferred wireless coverage area. On the other hand, an entry in the recent visits/calls column may be a count of recent calls that the WCD made using resources of the preferred wireless coverage area. Such a call might be a voice call, a data call, or some other type of communication.

An entry in the "recent visits (calls) resulting in rapid handoff" column may be a count of recent visits that the WCD made to the preferred wireless coverage area wherein the WCD was handed off to a non-preferred wireless coverage area, either during or after the visit, within a relatively short period of time. Alternatively, an entry in this column may be count of recent calls that the WCD made, using the resources of the preferred wireless coverage area, in which the WCD was handed off to a non-preferred wireless coverage area within a relatively short period of time after call initiation. Preferably, this column measures the same types of event (i.e., calls or visits) that the "recent calls (visits)" column measures.

Regardless of how calls or visits are measured, the "recent visits (calls) resulting in rapid handoff" column may be used to determine how frequently in the past that the WCD with the specified WCD identifier either registered for service with the preferred wireless coverage area and was rapidly handed off, or used resources of the preferred wireless coverage area and was rapidly handed off. If either event or both events occurs frequently, this may indicate that the WCD is likely to be handed off from the preferred wireless coverage area to a non-preferred wireless coverage area.

For example, a WCD may register for service in the preferred wireless coverage area. Whether or not the WCD actually uses any bearer resources of the preferred wireless coverage area, the RAN may record the time of this registration. Accordingly, the RAN may increment the WCD's entry in the "recent visits (calls)" column of table 400. Then, the RAN may determine that the WCD has been handed off to a non-preferred wireless coverage area, and may record the time of the handoff. If the time between these two recorded events is less than a threshold duration (e.g., a few seconds to a few minutes), the RAN may deem the WCD to have been rapidly handed off to a non-preferred wireless coverage area. Therefore, the RAN may increment the WCD's entry in the "recent visits (calls) resulting in rapid handoff" column.

An entry in the "percentage" column of table 400 indicates, for the WCD with the specified WCD identifier, the percentage of recent visits (calls) that were rapidly handed off to a non-preferred, wireless coverage area. Preferably, these entries result from dividing the WCD's entry in the "recent visits (calls) resulting in rapid handoff" by the WCD's entry in the "recent visits (calls)" column.

For instance, in record 402 for WCD identifier 312-555-1000, out of five recent visits (calls), none resulted in such a rapid handoff. Thus, the entry in the "percentage" column is 0%, indicating that the WCD with this identifier is unlikely to be handed off to a non-preferred wireless coverage area in the future. Similarly, in record 406 for WCD identifier 312-555-1002, the entry in the "percentage" column is 10%, also indicating that the WCD with this identifier is unlikely to be handed off to a non-preferred wireless coverage area in the future. On the other hand, the entries in the "percentage" column for records 404 and 408 are 50% and 100%, respectively. Thus, the WCDs with the identifiers 312-555-1001 and 312-555-1003 are likely to be handed off to a non-preferred wireless coverage area again in the future.

It should be understood that table 400 contains examples of the type of information that a home service provider might use to determine whether a WCD is likely to roam. Thus, table 400 may include more or fewer columns or rows, each containing potentially different information than is shown in table 400. For instance, contents of the "percentage" column could be integer values or non-integer values, or could signify a percentage using other types of representations.

In practice, because of the large number of WCDs that typically subscribe with a given service provider, the size of a roaming-data database, such as table 400, may be quite large. Accordingly, in a further aspect, a switch or BTS may pre-load or cache roaming data for WCDs registered in the coverage area it serves. For example, when a WCD registers with the RAN in a coverage area served by a given BTS, the BTS may coordinate with its serving MSC to look up the roaming data for the WCD in the sector in which the WCD is registered. The BTS may then store the roaming data for the WCD in local data storage (i.e., data storage located at the switch) so that it is readily available in the event that the switch needs to page the WCD.

While the likelihood of roaming for a given WCD is preferably based on that WCD's roaming data for the coverage area (i.e., sector) in which the WCD is located, it also possible that the likelihood of roaming may be calculated based upon historical roaming data for all WCDs in a given coverage area. In such an embodiment, the likelihood of roaming for a given WCD may simply be the overall roaming-likelihood indicator for the coverage area in which the WCD is registered. Since the overall roaming-likelihood indicator does not indicate roaming tendency on a per-WCD basis, the overall roaming-likelihood indicator for a given WCD registered in a given coverage area will be the same as for all other WCDs registered in the coverage area.

In addition to the techniques for determining the likelihood of roaming discussed above, there may be other ways to accomplish such a determination that are in accordance with the embodiments herein. Furthermore, in some embodiments, a quantitative indication of the likelihood of roaming, which may be included in messaging between a RAN and a WCD, and/or between components of a RAN, may be referred to as a "roaming-likelihood indicator". For example, the "percentage" column of table 400 may be included as a roaming-likelihood indicator in messaging between a RAN and a WCD. A roaming-likelihood indicator may take other forms as well, without departing from the scope of the invention.

VI. Exemplary WCD-Implemented Methods

An exemplary method may be carried out by a WCD in an effort to reduce the likelihood of the WCD roaming to a non-preferred coverage area. In particular, the WCD may determine a likelihood of roaming, which indicates a likelihood that the WCD will be handed off from a preferred coverage area to a non-preferred coverage area, and then use the likelihood of roaming as a basis for managing its active set.

Figure 5A:
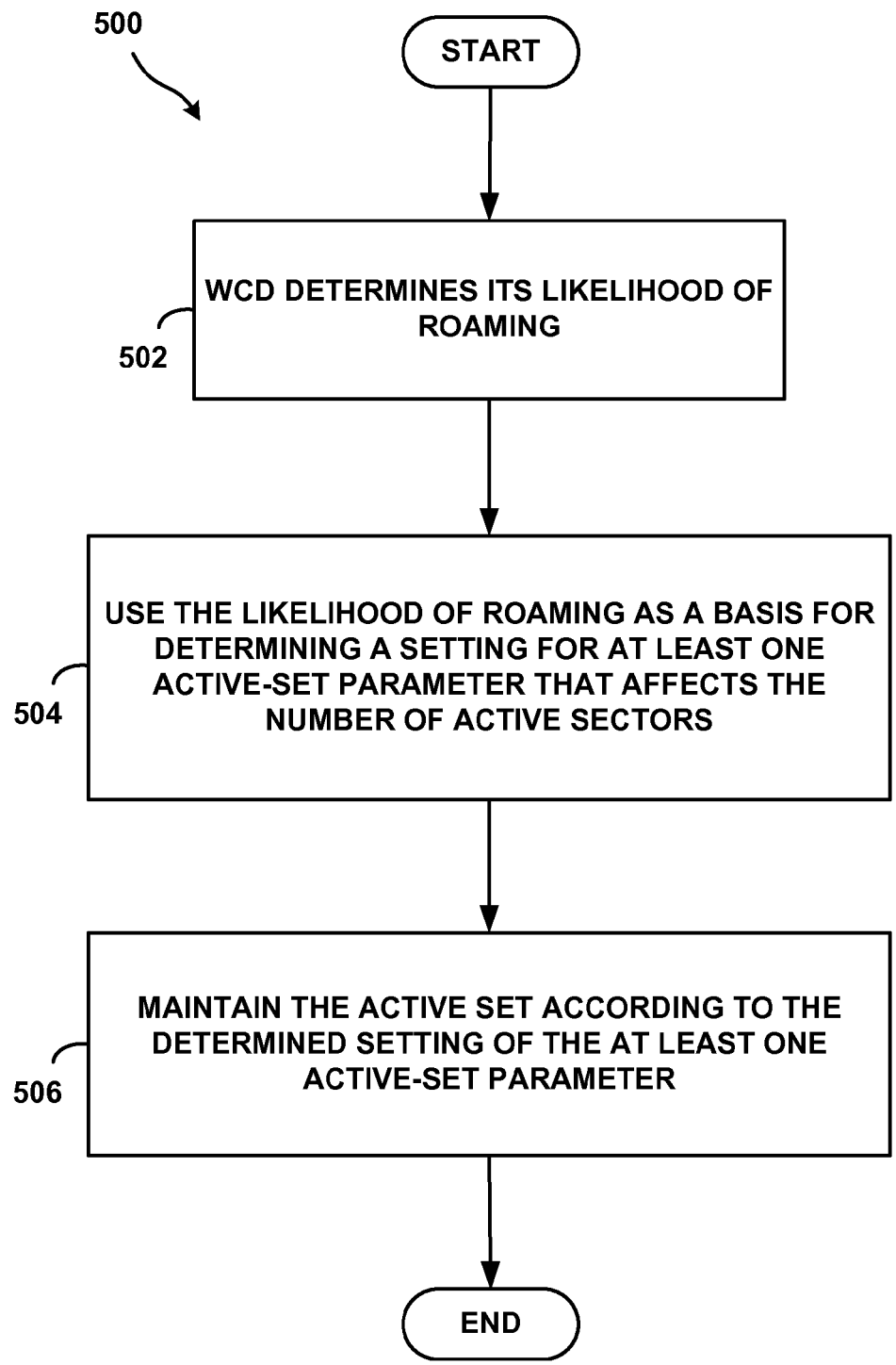
FIG. 5A is a flow chart illustrating a method that may be implemented by a wireless communication device, according to an exemplary embodiment.

FIG. 5A is a flow chart illustrating an exemplary method 500 that may be implemented by a WCD. As shown by block 502, the WCD initially determines its likelihood of roaming. The WCD then uses its likelihood of roaming as a basis for determining a setting for at least one active-set parameter that affects the number of active sectors in its active set, as shown by block 504. Then, as shown by block 506, the WCD maintains its active set according to the determined setting of the at least one active-set parameter.

The function of determining the likelihood of roaming may involve the WCD receiving an indication of the likelihood of roaming from a radio access network. In an exemplary embodiment, the mobile station may receive an indication of its likelihood of roaming whenever it registers with the RAN in a new coverage area (i.e., a new sector) and/or or whenever it is handed off from one preferred coverage area to another preferred coverage area within the RAN. For example, a roaming-likelihood indicator may be included as overhead information in each system parameters message that a mobile station receives upon registration in a new coverage area. Additionally or alternatively, a roaming-likelihood indicator may be included as overhead information in each HDM that is received from the RAN.

In some embodiments, the active-set parameter (or one of the active-set parameters) that is set by the WCD may be the maximum-active-sector parameter. In an effort to increase the number of sectors that can be included in the active set, the WCD may increase the value of the maximum-active-sector parameter as the likelihood of roaming increases. Conversely, as the likelihood of roaming decreases, the WCD may decrease the value of the maximum-active-sector parameter. Adjusting the maximum-active-sector parameter in this manner may help a WCD to include more sectors in the active set at times when the WCD is more likely to roam, which in turn may reduce the probability that the WCD is handed off to a non-preferred coverage area.

More specifically, WCDs are typically configured such that only sectors that are served by the home service provider are added to the active set, unless there are no such sectors that meet the criteria to be added to and/or kept in the active set. When no sector that is served by the home service provider meets the criteria to be added to or to be kept in the active set, the WCD may search for a sector that meets the requirements for its active set, without regard to whether or not the sector is served by its home service provider. In this scenario, the WCD may add a sector in a non-preferred coverage area to its active set, which may ultimately result in a handoff to the non-preferred coverage area. Therefore, increasing the number of sectors in the active set, this may help to prevent the scenario where the active set is empty, and the WCD consequently roams to a non-preferred coverage area.

Additionally or alternatively, the active-set parameter or parameters that are set by the WCD may include those that affect how likely a given sector is to be added to or kept in the active set (and thus ultimately may affect how many active sectors are in the active set). Such active-set parameters may include, but are not limited to, T_ADD, T_COMP, T_DROP, and/or T_TDROP. In an exemplary embodiment, the WCD may adjust one or more of these active-set parameters such that a given sector is more likely to be added to the active set and/or such that a given active sector is more likely to be kept in the active set. For example, the WCD may decrease T_ADD and/or decrease T_COMP, which may help to increase the probability that a given sector is added to the active set. Additionally or alternatively, the WCD may decrease T_DROP, and/or increase T_TDROP, which may help to increase the probability that a given sector is kept in the active set. By increasing the probability that a given sector is added to the active set and/or that a given active sector is kept in the active set, a WCD may be able to prevent a scenario where all sectors from a preferred coverage area are dropped from the active set of a WCD, and the WCD ends up roaming to a sector in a non-preferred coverage area. It should be understood, however, that these and other active-set parameters may be adjusted in other ways, and in a such a way as to achieve other benefits, without departing from the scope of the invention.

Figure 5B:
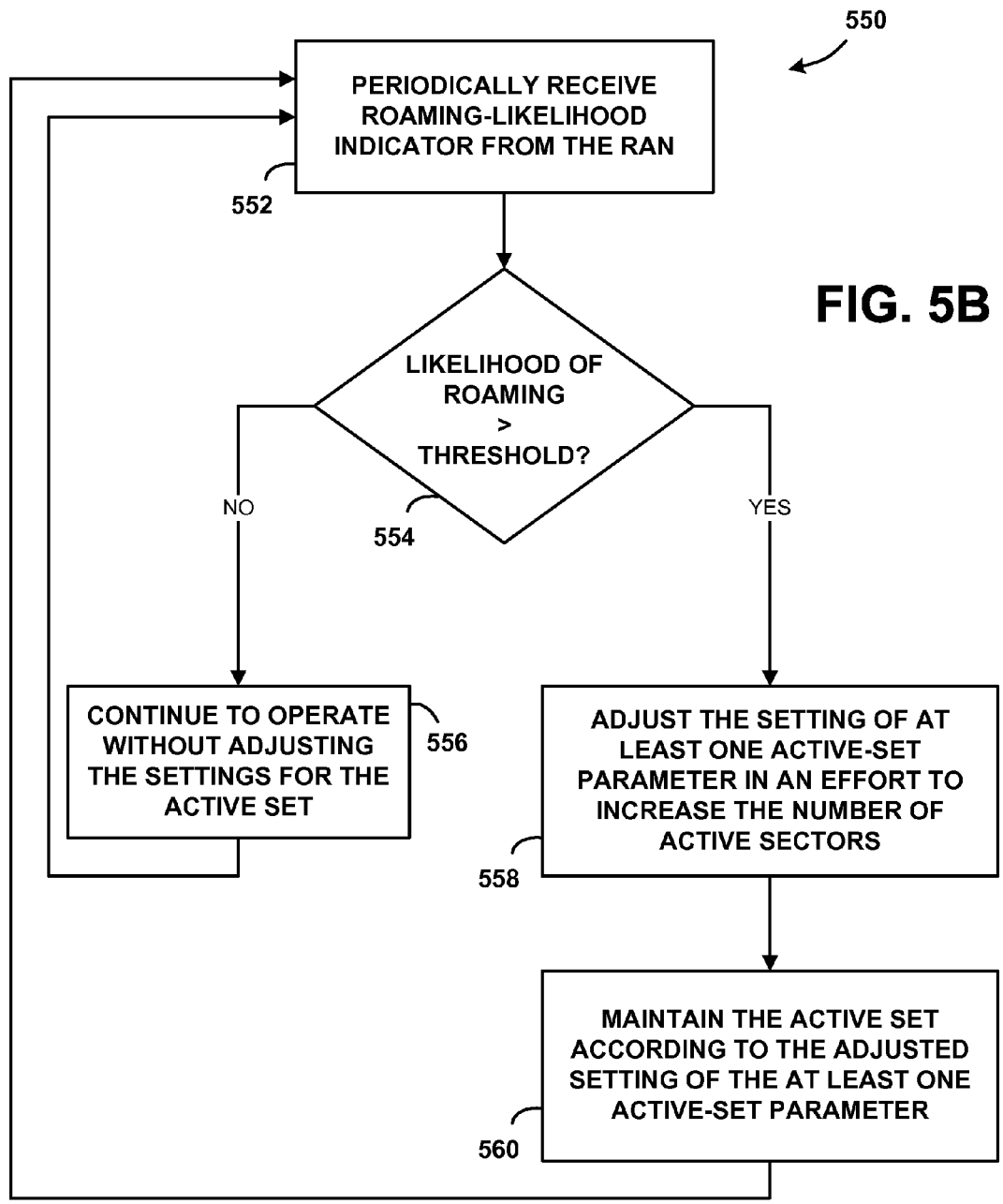
FIG. 5B is a flow chart illustrating another method that may be implemented by a wireless communication device, according to an exemplary embodiment.

In an exemplary embodiment, the step of using the likelihood of roaming as a basis for determining a setting for at least one active-set parameter may involve determining whether or not the determined likelihood of roaming is above a predetermined threshold. FIG. 5B is a flow chart illustrating a method 550, according to an exemplary embodiment in which a WCD adjusts the setting for at least one active-set parameter when the determined likelihood of roaming is above a predetermined threshold.

More specifically, method 550 involves the WCD periodically receiving a roaming-likelihood indicator from the RAN, which provides the WCD with an indication of the likelihood of roaming, as shown by block 552. Upon the receipt of each roaming-likelihood indicator or shortly thereafter, the WCD uses the roaming-likelihood indicator to determine whether or not its likelihood of roaming is above a predetermined threshold, as shown by block 554. If the WCD determines that its likelihood of roaming is below the predetermined threshold, then the WCD may continue to operate without adjusting the settings for its active set (and continue to check its likelihood of roaming as subsequent roaming-likelihood indicators are received from the RAN), as shown by block 556. However, if the WCD determines that its likelihood of roaming is above the predetermined threshold, then the WCD may adjust the setting of at least one active-set parameter in an effort to increase the number of active sectors that are included in its active set, as shown by block 558. The WCD may then maintain its active set according to the adjusted setting of the at least one active-set parameter, as shown by block 560.

In effort to increase the number of active sectors, an exemplary method may involve the WCD increasing the value of its locally-stored maximum-active-sector parameter from an initial maximum number to an increased maximum number, thereby allowing a greater total number of sectors to be included in the active set. For instance, the WCD may by default allow for up to three active sectors (i.e., set the maximum-active-sector parameter equal to three). The WCD may then increase the maximum number of active sectors to six (i.e., set the maximum-active-sector parameter equal to six) when the WCD detects that its likelihood of roaming is greater than a predetermined threshold of 50%, for example.

As noted above, FIG. 5B illustrates an exemplary method in which a WCD switches between two different settings for a given active sector, depending upon whether or not the likelihood of roaming is above a predetermined threshold. It should be understood, however, that a given active-set parameter may be adjusted more granularly, without departing from the scope of the invention. For example, the likelihood of roaming may be divided into percentage ranges (i.e., ranges of percentages for the percentage column of table 300 of FIG. 3), or may be divided into ranges that are quantified in another manner.

Figure 6:
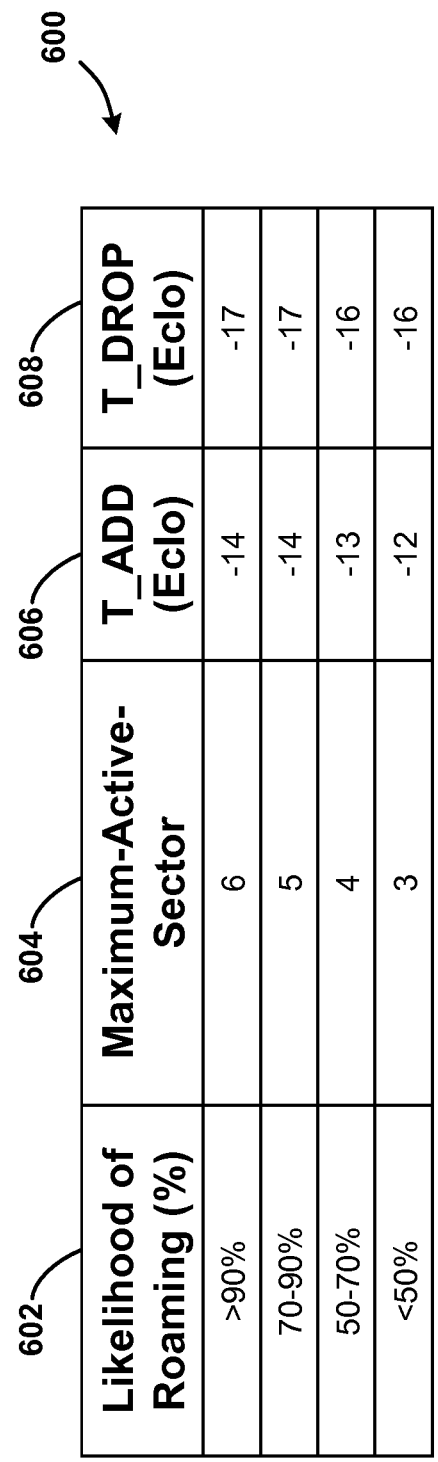
FIG. 6 shows a table that includes data indicating, for various likelihood of roaming ranges, the corresponding setting for the maximum-active-sector parameter, the corresponding T_ADD setting, and the corresponding T_DROP setting.

FIG. 6 shows a table 600 that includes data indicating, for various likelihood of roaming ranges 602, the corresponding setting for the maximum-active-sector parameter 604, the corresponding T_ADD setting 606, and the corresponding T_DROP setting 608. In this example, likelihood of roaming ranges 602 are percentage ranges for a WCD that determines its likelihood of roaming as a percentage in a manner described herein. The maximum-active-sector parameter indicates the maximum number of sectors that can be included in the WCD's active set. Further, T_ADD and T_DROP are indicated as the Ec/Io value at which a sector is eligible to be added to or dropped from the active set, respectively.

Once a WCD has determined its likelihood of roaming, the WCD may access data such as that stored in table 600 to determine the appropriate settings for these active-set parameters. In particular, if a WCD determines that the likelihood of roaming is greater than 90%, then based on table 600 the WCD will set the maximum-active-sector parameter equal to 6, set T_ADD equal to −14, and set T_DROP equal to −17. If, however, the WCD determines that the likelihood of roaming is between 70% and 90%, this means there is a lower probability that the WCD will be handed off to a non-preferred coverage area. Since the likelihood of roaming is lower, there is less need to maximize the number of active sectors, and the active-set parameters may be set accordingly. In particular, if the WCD determines that the likelihood of roaming is 76%, for instance, then table 600 indicates that the maximum-active-sector parameter should be set to 5, that T_ADD should be set equal to −14, and that T_DROP should be set equal to −17. Thus, while T_ADD and T_DROP remain set in the same manner as for the >90% range, the maximum number of active sectors is reduced from 6 to 5.

Table 600 also indicates that further reduction of efforts to maximize the number of active sectors should occur as the likelihood of roaming falls to the 50-70% range, and then below 50%. In particular, if the likelihood of roaming is between 50% and 70%, then table 600 indicates that the maximum-active-sector parameter should be reduced to 4, that T_ADD should be reduced to −13, and that T_DROP should reduced to −16. And if the likelihood of roaming is below 50%, then table 600 indicates that the maximum-active-sector parameter should be further reduced to 3, that T_ADD should be further reduced to −12, and that T_DROP should again be set to −16.

It should be understood that the specific likelihood of roaming ranges 602 and/or the corresponding values of the active-set parameters 604-608 may be set as a matter of engineering design choice, without departing from the scope of the invention. Furthermore, it should be understood that the combination of active-set parameters shown in table 600 is but one example, and that similar data may be provided for other combinations of one or more active-set parameters without departing from the scope of the invention.

VII. Exemplary RAN-Implemented Methods

In another aspect, an exemplary method may be implemented by a RAN, and in particular by a BTS, which may implement an exemplary method in order to help manage (or to facilitate the management of) a WCD's active set. For instance, an exemplary BTS may be configured to (i) determine the likelihood of roaming for a WCD operating in a preferred coverage area, and (ii) use the likelihood of roaming for the WCD as a basis for managing an active set of the WCD.

The management of a given WCD's active set by a BTS may involve the BTS automatically sending the WCD a roaming-likelihood indicator when the WCD registers in a coverage area served by the BTS. The WCD may then use the roaming-likelihood indicator to determine the setting for one or more active-set parameters, as described in reference to FIGS. 5A and 5B, for example. In an exemplary embodiment, a BTS may include a roaming-likelihood indicator as overhead information in the system parameters message that is sent when a mobile station registers in a given sector that is served by the BTS. The WCD may then evaluate whether the likelihood of roaming is such that while the WCD is located in the given sector, the WCD should adjust its active-set parameters in an effort to prevent roaming to a non-preferred coverage area. The BTS may also include a roaming-likelihood indicator as overhead information in each HDM sent by the BTS. By doing so, the BTS may provide each WCD that is handed off to a sector served by the BTS with an indication of the likelihood of roaming in that sector.

The roaming-likelihood indicator itself may take various forms. For example, each roaming-likelihood indicator may be a percentage indicating how likely a WCD is to roam. More specifically, the roaming-likelihood indicator may indicate the percentage of the particular WCD's calls that have historically been handed off from a preferred coverage area in which the WCD just registered to a non-preferred coverage area. In such an embodiment, the roaming-likelihood indicator may be determined using data such as that illustrated by table 400 of FIG. 4. However, the percentage indicated by the roaming-likelihood indicator may be determined in other ways as well. As one example, the percentage may be calculated based upon historical roaming data for all WCDs in the preferred coverage area in which a WCD has just registered (and thus is the same for all WCDs in that coverage area). As another example, the percentage may be calculated based upon historical roaming data for the particular WCD over all sectors in the RAN, or possibly over a subset of sectors in the RAN (e.g., the sector in which the WCD has just registered and nearby sectors within a certain distance from this sector).

To provide roaming-likelihood indicators, a RAN preferably maintains a database containing roaming data such as that illustrated by table 400 of FIG. 4. As such, whenever a mobile station registers in and/or is handed off to a sector served by a given BTS, the BTS may access this database (possibly via its serving MSC) in order to retrieve the roaming data necessary to provide a roaming-likelihood indication to the WCD. Alternatively, the BTS may notify its serving MSC when a mobile station registers in and/or is handed off to a sector served by the BTS. The MSC may then retrieve the appropriate roaming data and provide the roaming likelihood indication to the BTS for transmission to the WCD.

In an alternative embodiment, a BTS may take a more active role in managing a WCD's active set. For example, a BTS may evaluate the likelihood of roaming before sending a roaming-likelihood indicator to a WCD, and only send the roaming-likelihood indicator when the BTS determines that the likelihood of roaming warrants the WCD making an effort to prevent a handoff to a non-preferred coverage area.

Figure 7:
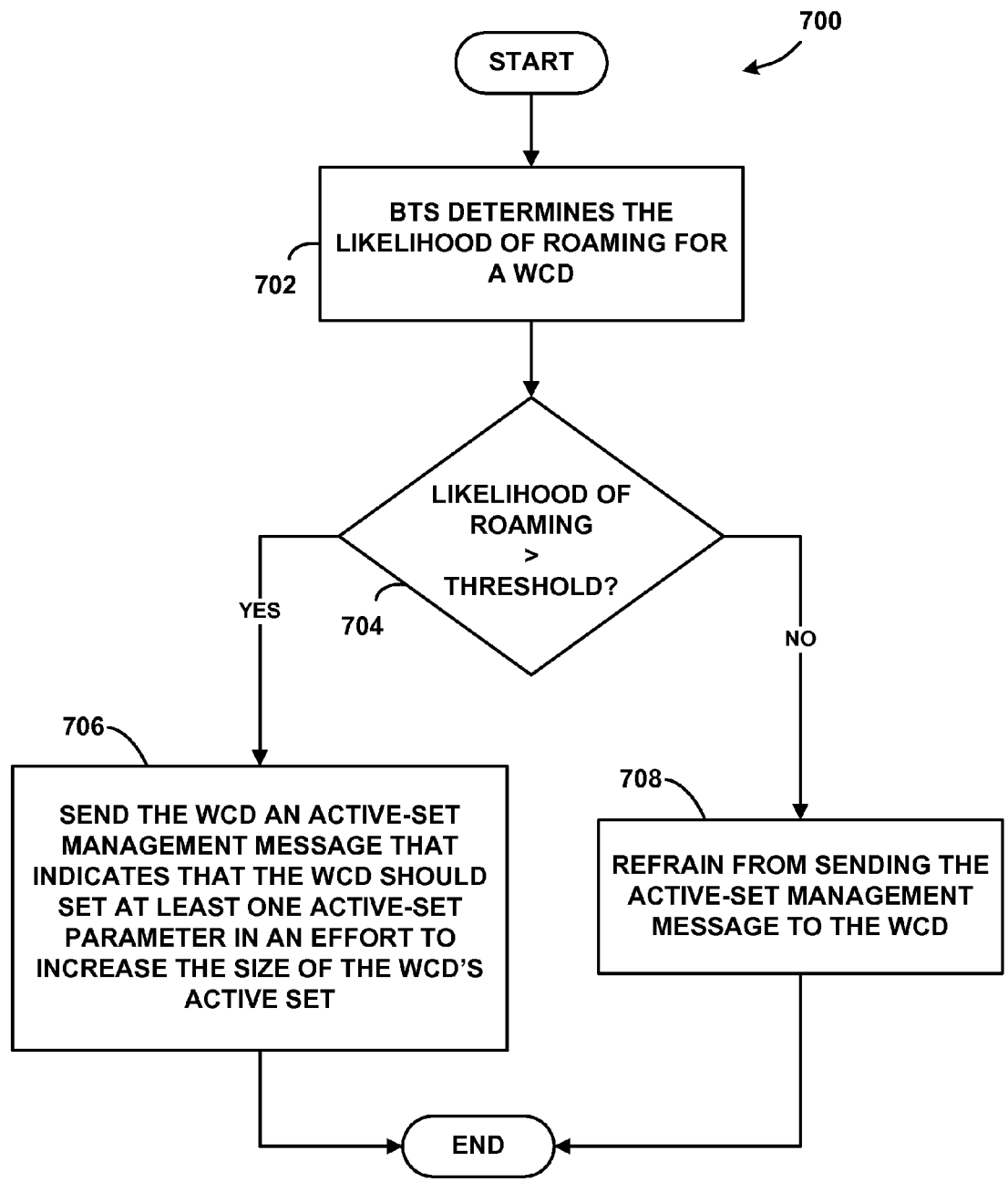
FIG. 7 is a flow chart illustrating a method that may be implemented by a component of a radio access network, according to an exemplary embodiment.

FIG. 7 is a flow chart illustrating a method 700 that may be implemented by a BTS, according to an exemplary embodiment in which the BTS takes a more active role in managing a WCD's active set. According to method 700, the BTS initially determines the likelihood of roaming for a WCD, as shown by block 702. The BTS then determines whether or not the likelihood of roaming for the WCD is above a predetermined threshold, as shown by block 704. If the likelihood of roaming is above the predetermined threshold, then the BTS sends the WCD an active-set management message, as shown by block 706. The active-set management message preferably indicates that the likelihood of roaming for the WCD is such that the WCD should set at least one active-set parameter in an effort to increase the size of the WCD's active set (i.e., in an effort to increase the number of active sectors). On the other hand, if the likelihood of roaming is below the predetermined threshold, then the BTS refrains from sending the active-set management message that indicates that the WCD should set at least one active-set parameter in an effort to increase the number of active sectors, as shown by block 708.

In one embodiment of method 700, the BTS may only sends an active-set management message when it is determined that the likelihood of roaming is such that a WCD should make an effort to increase the number of sectors in its active set and/or to keep more sectors in its active set. Accordingly, a WCD may take the receipt of such an active-set management message as de facto indication that it should adjust the settings for its active set in an effort to prevent being handed off to a non-preferred coverage area.

Alternatively, the BTS may automatically send active-set management messages, each of which may or may not indicate that the WCD should adjust its active-set parameters. As such, when the BTS refrains from sending the active-set management message that indicates that the WCD should set at least one active-set parameter in an effort to increase the number of active sectors, as in block 708, the BTS may instead send an active-set management message that indicates to the WCD that it should continue to function as it has been, without adjusting its active-set parameters. For example, each active-set management message may simply be a roaming-likelihood indicator that is automatically included in a system parameters message and/or an HDM whenever the BTS sends these messages. In particular, each roaming-likelihood indicator may be a bit that is included as overhead information in a system parameter message and/or an HDM. This roaming-likelihood bit may be set to "1" when the likelihood of roaming is greater than a predetermined threshold, and set to "0" when the likelihood of roaming is below the predetermined threshold. Accordingly, when the WCD receives a system parameters message in which the roaming-likelihood bit is set to "1", this indicates to the WCD to adjust its active-set parameters in an effort to keep a greater number of sectors in its active set.

In another alternative embodiment, the active-set management message may identify the specific active-set parameters that the WCD should adjust (e.g., the maximum-active-sector parameter, T_ADD, T_COMP, T_DROP, and/or T_TDROP), and possibly the specific setting that should be used for each active-set parameter that is identified. For example, the BTS and/or the MSC may determine settings for one or more of these active-set parameters based on the likelihood of roaming, and indicate the determined settings in a system parameter message or an HDM. It should be understood that in this and other embodiments, the active-set management message may alternatively be sent as a separate message and not included as part of a system parameter message or an HDM. Furthermore, active-set management messages may indicate how a WCD should set its active-set parameters in other ways, without departing from the scope of the invention.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
determining a likelihood of roaming, wherein the likelihood of roaming indicates a likelihood that a wireless communication device (WCD) will be handed off from a preferred coverage area that is operated by a home service provider, to a non-preferred coverage area that is operated by another service provider that is different from the home service provider, and wherein the WCD determines the likelihood of roaming; and
using, by the WCD, the likelihood of roaming as a basis for managing an active set of the WCD.

2. The method of claim 1, wherein determining the likelihood of roaming comprises receiving an indication of the likelihood of roaming from a radio access network.

3. The method of claim 1, wherein the other service provider is a roaming partner of the home service provider.

4. The method of claim 1, wherein using the likelihood of roaming as a basis for managing an active set of the WCD comprises setting a maximum number of active sectors that the WCD can include in the active set of the WCD.

5. The method of claim 4, wherein setting the maximum number of active sectors comprises setting a value of a maximum-active-sector parameter that is stored at the WCD.

6. The method of claim 4, wherein setting the maximum number of active sectors comprises:
if the likelihood of roaming is below a first threshold, then setting the maximum number of active sectors to a first maximum number; and
if the likelihood of roaming is above the first threshold, then setting the maximum number of active sectors to a second maximum number that is greater than the first maximum number.

7. The method of claim 6, wherein setting the maximum number of active sectors further comprises:
if the likelihood of roaming is above a second threshold, then setting the maximum number of active sectors to a third maximum number, wherein the second threshold corresponds to a greater likelihood of roaming than the first threshold, and wherein the third maximum number is greater than the second maximum number.

8. The method of claim 1, wherein managing the active set of the WCD comprises:
setting at least one active-set parameter affecting the number of active sectors in an active set of the WCD; and
maintaining the active set according to the at least one active-set parameter.

9. The method of claim 8, wherein setting the at least one active-set parameter comprises setting at least one active-set parameter affecting whether or not a given sector is included in the active set.

10. The method of claim 9, wherein setting the at least one active-set parameter affecting whether or not a given sector is included in the active set comprises setting at least one of the following parameters: (a) a threshold pilot strength for addition to the active set (T_ADD), (b) a threshold difference in signal strength from an active set pilot (T_COMP), (c) a threshold pilot strength for removal from the active set (T_DROP), and (d) a time for which an active set pilot falls below T_DROP to justify removal from the active set (T_TDROP).

11. The method of claim 9, wherein setting at least one active-set parameter affecting whether or not a given sector is included in the active set comprises at least one of (a) setting at least one active-set parameter affecting a probability that a given sector will be added to the active set, (b) setting at least one active-set parameter affecting a probability that a given active sector will be kept in the active set, and (c) setting at least one active-set parameter affecting a probability that a given active sector will be dropped from the active set.

12. The method of claim 9, wherein using the likelihood of roaming as a basis for setting the at least one active-set parameter comprises:
determining whether or not the likelihood of roaming is above a threshold;
if the likelihood of roaming is above the threshold, then at least one of (a) setting at least one active-set parameter in an effort to increase a probability that a given sector will be added to the active set, (b) setting at least one active-set parameter in an effort to increase a probability that a given active sector will be kept in the active set, and (c) setting at least one active-set parameter in an effort to decrease a probability that a given active sector will be dropped from the active set; and
if the likelihood of roaming is below the threshold, then setting the at least one active-set parameter to a default setting.

13. A system comprising:
at least one processor;
a non-transitory computer-readable medium; and
program instructions stored on the non-transitory computer-readable medium and executable by the at least one processor to:
  (a) determine a likelihood of roaming, wherein the likelihood of roaming indicates a likelihood that a wireless communication device (WCD) will be handed off from a preferred coverage area that is operated by a home service provider, to a non-preferred coverage area that is operated by another service provider that is different from the home service provider; and
  (b) use the likelihood of roaming as a basis to manage an active set of the WCD.

14. The system of claim 13, wherein the program instructions stored on the non-transitory tangible computer-readable medium and executable by at least one processor to use the likelihood of roaming as a basis to manage an active set of the WCD comprise program instructions stored on the non-transitory tangible computer-readable medium and executable by at least one processor to set a maximum number of active sectors that the WCD can include in the active set of the WCD.

15. The system of claim 13, wherein the program instructions stored on the non-transitory tangible computer-readable medium and executable by at least one processor to manage the active set of the WCD comprise program instructions stored on the non-transitory tangible computer-readable medium and executable by at least one processor to:
  set at least one active-set parameter that affects whether or not a given sector is included in the active set; and
  maintain the active set according to the at least one active-set parameter.

16. The system of claim 15, wherein the at least one active-set parameter that affects whether or not a given sector is included in the active set comprises at least one of: (a) a threshold pilot strength for addition to the active set (T_ADD), (b) a threshold difference in signal strength from an active set pilot (T_COMP), (c) a threshold pilot strength for removal from the active set (T_DROP), and (d) a time for which an active set pilot falls below T_DROP to justify removal from the active set (T_TDROP).

17. The system of claim 13, wherein the program instructions stored on the non-transitory tangible computer-readable medium and executable by at least one processor to manage the active set of the WCD comprise program instructions stored on the non-transitory tangible computer-readable medium and executable by at least one processor to:
  determine whether or not the likelihood of roaming is above a predetermined threshold;
  if the likelihood of roaming is above the predetermined threshold, then send the WCD an active-set management message comprising an indication to the WCD to adjust at least one active-set parameter, wherein the at least one active-set parameter affects the number of active sectors in an active set of the WCD; and
  if the likelihood of roaming is below the predetermined threshold, then refrain from sending the active-set management message comprising the indication to the WCD to adjust the at least one active-set parameter.

18. A method comprising:
determining a likelihood of roaming, wherein the likelihood of roaming indicates a likelihood that a wireless communication device (WCD) that is operating in a preferred coverage area of a radio access network (RAN) will be handed off from the preferred coverage area to a non-preferred coverage area, and wherein the likelihood of roaming is determined by the RAN;
determining whether or not the likelihood of roaming for the WCD is above a predetermined threshold;
if the determined likelihood of roaming is above the predetermined threshold, then sending the WCD an active-set management message comprising an indication to the WCD to adjust at least one active-set parameter, wherein the at least one active-set parameter affects the number of active sectors in an active set of the WCD; and
if the likelihood of roaming is below the predetermined threshold, then refraining from sending the active-set management message.

19. The method of claim 18, further comprising:
determining, by the RAN, that the WCD has traveled to a second preferred coverage area of the RAN;
re-determining the likelihood of roaming, wherein the re-determined likelihood of roaming indicates a likelihood that the WCD will be handed off from the second preferred coverage area to a non-preferred coverage area; and
using the re-determined likelihood of roaming for the WCD as a basis for managing the active set of the WCD.

20. The method of claim 18, further comprising:
determining that the WCD has traveled to a second preferred coverage area of the RAN;
re-determining the likelihood of roaming, wherein the re-determined likelihood of roaming indicates a likelihood that the WCD will be handed off from the second preferred coverage area to a non-preferred coverage area; and
if the RAN previously sent the active-set management message comprising the indication to the WCD to adjust the at least one active-set parameter, then:
  (a) if the re-determined likelihood of roaming for the WCD is above the predetermined threshold, then allowing the WCD to continue to operate according to the active-set management message comprising the indication to the WCD to adjust the at least one active-set parameter; and
  (b) if the re-determined likelihood of roaming for the WCD is below the predetermined threshold, then sending an active-set management message comprising the indication to the WCD to re-adjust the at least one active-set parameter;
if the RAN previously refrained from sending the active-set management message comprising the indication to the WCD to adjust the at least one active-set parameter, then:
  (a) if the re-determined likelihood of roaming for the WCD is above the predetermined threshold, then sending the active-set management message comprising the indication to the WCD to adjust the at least one active-set parameter;

(b) if the re-determined likelihood of roaming for the WCD is below the predetermined threshold, then again refraining from sending the active-set management message comprising the indication to the WCD to adjust the at least one active-set parameter.

* * * * *